United States Patent Office 3,256,485
Patented June 14, 1966

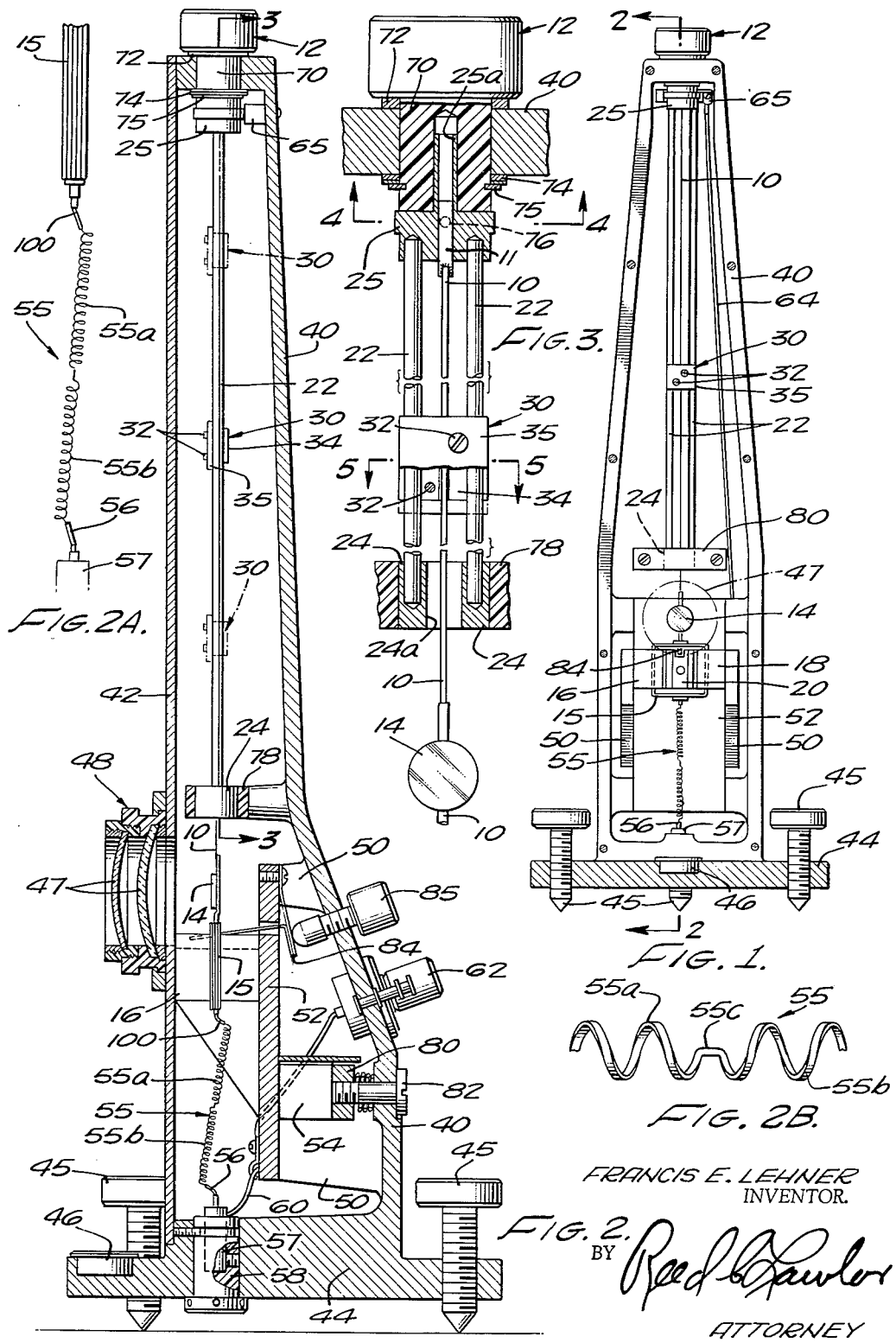

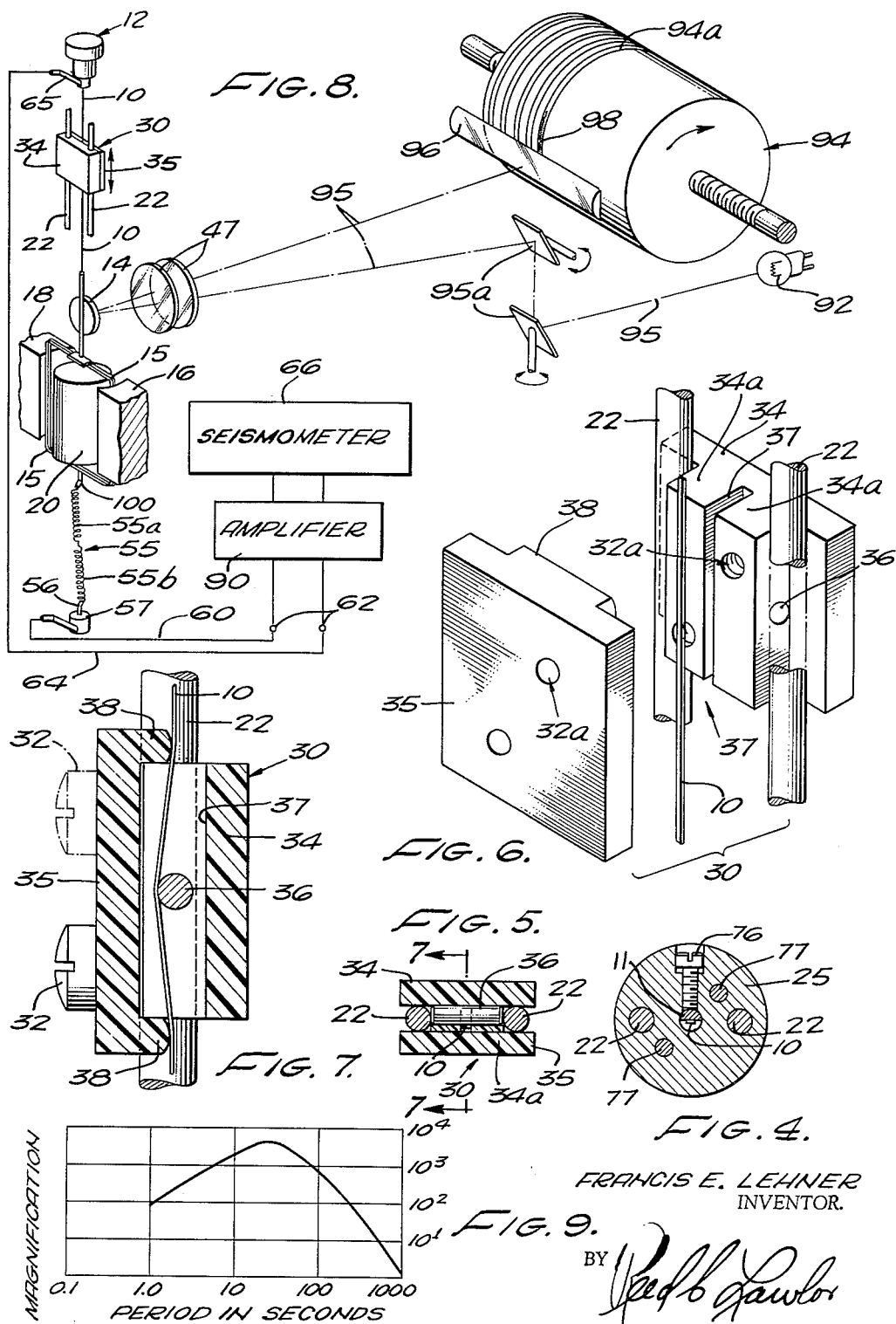

3,256,485
LOW FREQUENCY RIBBON SUPPORTED GALVANOMETER WITH SLIDABLE RIBBON CONTACTING MEANS FOR ADJUSTING THE PERIOD THEREOF
Francis E. Lehner, Monrovia, Calif., assignor to United Electrodynamics, Inc., Pasadena, Calif., a corporation of California
Filed Dec. 1, 1961, Ser. No. 156,452
13 Claims. (Cl. 324—97)

This invention relates to improvements in long-period galvanometers to be employed in such fields as the field of seismology. More particularly, the invention relates to a galvanometer including improved means for adjusting the period of the galvanometer.

In the field of seismology, it is customary to record both "short period" waves and "long period" waves at a seismological station. Waves which have periods of the order of one second are considered short period waves while waves that have periods of the order of sixty seconds are considered long period waves. More particularly, long period waves may be waves which have periods in the range that extends from about ten seconds to about several minutes. Records of both short period waves and long period waves are employed in the determination of the location and strength of earthquakes or other seismological disturbances and for other purposes. Galvanometers having short periods are employed to emphasize short period components of waves being recorded, while galvanometers having long periods are employed to emphasize long period components of waves being recorded. Short period waves are employed in the study of seismic waves that have travelled from distant points of thousands of miles, as well as seismic waves that have travelled from nearby points of several hundred miles. On the other hand, long period waves are employed primarily in the study of waves originating in earthquakes and other seismological disturbances that have originated thousands of miles from the seismological station.

In many studies of seismic disturbances, stations having seismographs or seismometers are located at widely separated points and seismograms, that is, records of seismic waves received at the various stations, are sent to a central interpretation station where the records on the seismograms are compared in order to determine more accurately various characteristics of the seismic disturbance such as its location and severity. In order to make it possible to make accurate comparisons between the waves recorded at various stations, it is important that the seismographs located at those stations have the same frequency and amplitude response characteristics; that is, the characteristics of the seismographs located at the various stations should be so similar that identical seismograms could be produced at the various stations if seismographs from various stations were to be interchanged.

The period that is most suitable to use depends somewhat upon the purpose of the study. Sometimes a seismologist wants to make records with a 40-second galvanometer, at other times with a 100-second galvanometer, and at other times with galvanometers of other periods. While it is not usual to change the period of the galvanometer once it has been installed at a station, except perhaps after some preliminary tests have been made with it, nevertheless it is desirable to provide a galvanometer whose period is adjustable so that individual galvanometers can be supplied with the same or different periods as demanded by the seismologist.

Accordingly, one of the objects of this invention is to provide an improved long period galvanometer which includes simple means for adjustment or variation of the period.

Another object of the invention is to provide a galvanometer for which the period may be adjusted over a wide range, such as a range extending from about 20 seconds to about 100 seconds.

Another object of the invention is to provide an adjustable galvanometer which permits accurate adjustment to a predetermined period, so that a large number of galvanometers that are to be located at widely dispersed points and used for related purposes can be adjusted to have the same period.

It is a specific object to provide for adjusting the effective length of a filament carrying the coil of a galvanometer whereby to adjust the period.

Other objects of the invention and the various features of construction will become apparent from the following specification and the accompanying drawings wherein the form of the invention presently deemed to be the best embodiment is illustrated.

In the drawings:

FIG. 1 is a vertical elevation of a galvanometer embodying the present invention and contained within a housing from which the front cover has been removed;

FIG. 2 is in general a vertical section taken approximately on the line 2—2 of FIG. 1, the front cover and lens combination and coil clamp being mounted in operative position;

FIGS. 2A and 2B are elevational details of the spring formation of the lower filament portion;

FIG. 3 is an enlarged vertical sectional detail taken approximately on the line 3—3 of FIG. 2;

FIG. 4 is an enlarged cross-sectional detail taken on the line 4—4 of FIG. 3;

FIG. 5 is an enlarged cross-sectional detail taken on the line 5—5 of FIG. 3;

FIG. 6 is an exploded isometric perspective view of the slidingly adjustable bridge of FIGS. 3 and 5;

FIG. 7 is a vertical sectional detail through the sliding bridge as indicated by the line 7—7 of FIG. 5;

FIG. 8 is a diagrammatic showing indicating the use to which the improved galvanometer hereof will commonly be put; and FIG. 9 is a graph repersenting a typical response curve of a system employing a galvanometer of this improvement with a 90-second period in connection with a seismometer having a 30-second period.

Briefly outlined, this invention utilizes a conducting suspension ribbon of adjustable length and a dual helical spring of adjustable inclination connected to a galvonometer coil and mirror suspended in the field between magnetic poles of a galvanometer structure of the D'Arsonval type together with means for adjusting the period of the galvanometer to a predetermined value. One part of the system provides a coarse adjustment and another part a fine adjustment.

According to one feature of this invention, the ribbon which is normally connected above the upper end of the galvanometer coil and the helical spring which is normally connected at the lower end of the core are of lengths sufficient to support the coil between upper and lower mountings without applying more than a slight tension to the ribbon and the coil, thus resulting in a freely-hanging suspension. According to another feature of the invention, the spring is attached to very small tabs which may be bent at small angles in opposite directions from the axis of the instrument in order to reduce the torque constant produced by the spring. In this way the period of the galvanometer may be set coarsely at a very high value within the range of the instrument. According to still another feature of this invention, the suspension ribbon is disposed between guides along which there slides a bridge element which has sliding contact with the suspension ribbon. By means of this adjustment the effective length of the suspension ribbon may be changed whereby the period of the galvanometer may be correspondingly precisely set at any predetermined value as may be demanded for any given purpose within the range of operation of the galvanometer. The tab structure provides for gross adjustment of the period while the bridge structure provides for fine adjustment of the period.

With reference to the drawings, a flat metallic ribbon filament 11, preferably formed of gold alloy and herein usually referred to as a ribbon, is suspended at its top from a semi-cylindrical rod 11 centrally mounted in a rotary insulating knob 12 which is externally exposed as illustrated. The knob 12 also serves as a zero adjustment and also as an insulator for the upper end of the ribbon 10. The lower portion of the ribbon 10 suspends a small reflecting mirror 14 and also suspends below the mirror a rectangular galvanometer coil 15 electrically connected with the suspending ribbon 10 and operatively positioned between magnet poles 16 and 18. As indicated in FIG. 1 and also in the diagrammatic showing of FIG. 8, a typical fixed core 20 may be disposed between the swinging arms or sidewalls of the coil 15 and therefore between the magnet poles 16 and 18.

To provide for adjustment of the effective length of the suspending ribbon 10 as it hangs from the knob 12, there is disposed at the opposite sides of the ribbon 10 a pair of guide rods 22, which may be brass rods, the upper and lower ends of which are held in relatively fixed positions at the sides of the ribbon 10 in a lower insulated mounting 24 and in an upper insulated support 25. The ribbon 10 depends through a bore 24a (FIG. 4) in the mounting 24 and hangs freely therein.

Carried upon the guide rods 22, and spanning the space between them, is a slidably adjustable bridge element 30 which slidably engages the ribbon 10 at all times, as perhaps best indicated in FIGS. 5 and 7, and is fixedly held on the rods 22 by clamp screws 32 received in screw holes 32a (FIG. 6). The sliding bridge element 30 is formed with a back member 34 and a front member 35 of preferably non-conductive material such as the plastic known as "Lucite." The ribbon 10 passing through the bridge element 30 frictionally engages an offsetting transverse pin 36 retained in spaced wings 34a of the back member 34 and spanning a narrow guide slot 37 between such wings. The ends of such pin 36 are positioned out of contact with the guide rods 22. As best seen in FIG. 7, rearwardly projecting fingers 38 at the upper and lower ends of the forward member 35 press the ribbon 30 back into aligned position in the slot 37 above and below the cross-pin 36 whereby to maintain the required offsetting frictional contact between the ribbon 10 and the pin 36. By these means, the effective rotative length of the galvanometer ribbon 10 is that portion of the ribbon 10 below the bridge element 30.

The galvanometer parts above described are vertically carried in a vertical housing 40 which is provided with a readily removable cover 42 seen in FIG. 2 but removed in FIG. 1 to reveal the interior. This housing 40 desirably is a cast aluminum housing. With the cover 42 attached, the effect of air damping is so slight that under normal operating conditions evacuation of the interior is not required. The housing 40 is integrally carried by a base 44 which is conveniently provided with three leveling screws 45 and a bubble level 46. The cover 42 is provided with a pair of convex cylindrical lenses 47 such as convex plano-cylindrical or convex toric plano-cylindrical lens for focusing light beams passing to and from the mirror 14. The cylindrical axes of the two lenses 47 are separately adjustable relative to each other about the optical axis in respective mountings indicated at 48 so that the required focusing of the light beams is easily accomplished.

As seen in FIGS. 1 and 2, the lower portion of the back wall of the housing 40 is provided with forwardly projecting brackets 50 supporting a mounting wall 52 carrying a permanent magnet 54 (FIG. 1) and the pole pieces 16 and 18 between which the galvanometer coil 15 rotates on the suspension ribbon 10. This wall 52 also serves to support the fixed core 20 about which the galvanometer coil 15 rotates in its limited oscillations.

A soft coiled spring 55 is connected between the lower end of the galvanometer coil 15 and a mounting 57 carried in an insulator 58 in the base 54. In the long period galvanometer illustrated the coil spring is made of the same material as the ribbon 10 and is formed of two oppositely coiled helices 55a and 55b that are connected at 55c, as shown in FIGS. 1, 2, 2A and 2B. The spring 55 and ribbon 10 serve as electrical conductors that provide electrical connections for the galvanometer coil 15. The lower end of the spring 55 is connected to an electric terminal or tab 56 of a mounting 57 carried in an insulator 58 in the base 44 and leading through a suitable line 60 to one of a pair of terminals 62 at the back of the lower portion of the housing 40. The other terminal 62 receives the lower end of an insulated conductor 64 (FIG. 1) leading up to an insulated contact 65 connected with the upper end of the ribbon 10. By these means a circuit that includes the ribbon 10, the coil 15, the spring 55 and the two conductors 60 and 64, is formed between the two terminals 62 at the back of the housing 40. Thus, current to the galvanometer coil 15 is supplied through the terminals 62 from whatever instrument desired, such as a seismometer or seismograph 66 indicated in FIG. 8.

Returning to the mounting of the guide rods 22 for the bridge element 30, the rods 22 of the two mounting members 24 and 25 and the zero adjustment knob 12 at the top of the housing 40 constitute a mounting frame which not only contains and mounts the two rods 22 but also constitutes in its entirety a zero adjustment device for the mirror 14 at the lower end of the galvanometer ribbon 10. The lower portion 70 of the insulating knob 12 depends through an opening in the top of the housing 40, as best indicated in FIGS. 2 and 3, the head of the knob 12 resting upon an appropriate washer 72. At the under side of the top of the housing 40 appropriate washer means 74 is provided, and beneath this a split snap ring 75 engages in a groove in the lower section 70 and retains the parts in assembled relationship. The knob portion 70 receives in an axial bore an upper sleeve end 25a of the upper support mounting 25 for the rods 22, and a set screw 76 (FIG. 4) anchors the upper end of the ribbon 10 in position in the mounting 25. Screws 77 secure the mounting 25 to the under side of the portion 70 of the knob 12. The lower mounting 24, in which the lower ends of the rods 22 are soldered, is rotatable through the knob 12 and the rods 22 in an insulating positioning bracket 78 when the knob 12 is adjusted.

For the purpose of varying the flux density over a broad range for ease in matching the galvanometer to other system constants, an adjustable magnetic shunt 80 is provided as seen in the lower portion of FIG. 2, the adjustment being effected through such means as an adjusting screw 82. In order to mechanically ground or inactivate the coil 15 for shipment purposes or the like, some such means as a spring element 84 under the control of an adjusting screw 85 may be employed, whereby to raise and lower the coil as required.

In FIG. 8, there is diagrammatically indicated one system in conjunction with which the present galvanometer may be desirably employed. Here a seismometer 66, as above mentioned, supplies electrical current, as through an amplifier 90 to the galvanometer coil 15 by way of the conductors 60 and 64. The current flowing through the coil 15 reacts with the magnetic field between the poles 16 and 18 to induce an oscillating movement of the coil 15 between such poles in accordance with the amplitude and frequency of the current supplied from the seismometer 66 as is well known in the art, causing the mirror to oscillate in a corresponding manner. With the system illustrated, a constant light source 92, arranged in conjunction with a photographic drum recorder 94 carrying a photographic record sheet 94a, is used to supply a beam of light 95 to the mirror 14 by way of the lenses 47, and thence back from the mirror 14 through the lenses 47 to an elongated cylindrical lens 96 which transmits the light beam 95 to the record paper 94a to form thereon a seismogram trace 98. Such mirrors 95a may be employed as necessary to direct the light beam 95 in a proper path.

With the arrangement just described, the seismometer 66 (together with its amplifier 90 if employed) transmits an electric current in accordance with seismic disturbances received by the seismometer 66 in the usual manner to the galvanometer. The mirror 14 on the galvanometer ribbon 10 is actuated by reason of the galvanometer coil 15 to reflect the light beam 95 to the recording paper 94a in accordance with the seismic disturbances picked up by the seismometer 66. Thus a record 98 reflecting these disturbances is produced on the photographic record paper 94a. By adjusting the effective length of the galvanometer ribbon 10 as heretofore described, the period of the galvanometer is set to conform with the requirements deemed optimum by the seismologist for his purpose.

A galvanometer of the present type lends itself admirably to the employment of three such galvanometers in a conventional three-component system embodying a three-drum photographic recorder, such as the drum 94 if employing three recording units producing three photographic records. A particular system of the indicated nature may embody three of the present galvanometers wherein the focal length of the optical system of each is nominally of one-meter focal length capable of adjustment over a range of about 0.75 to 1.25 meters. The zero position of the mirror 14 is readily adjustable through the knob 12, and the optical beam is rotatable through a total usable angle of approximately 50° without shadows by the optical system.

In addition to the specifications furnished above, the following outline further indicates the manner of use and functioning of the galvanometer of the present improvement.

The period T of a galvanometer is determined by the following formula:

$$T = 2\pi \sqrt{\frac{I}{C}}$$

wherein I equals the effective moment of inertia of the coil, and C equals the torque constant of suspension of the ribbon filament 10 used.

In this particular instance, the galvanometer coil 15 is about 2.2 cm. square with a wall depth of about 3 mm. and a wall thickness of about 1 mm., and has a mass of about 1.5 grams. Thus it has a moment of inertia of about 1.0 g. cm.$^2$.

The ribbon 10 of this galvanometer has a nominal torque constant of 0.044 dyne/radian for a ribbon of one centimeter length when supporting a load of the order of 1.5 grams. The restoring torque on the coil 15 provided by the ribbon 10 varies inversely as the length of the ribbon.

In this particular case the torque constant $$C = \frac{0.044}{L}$$

where L equals the length of the suspension, that is, the length of the ribbon between the top of the galvanometer coil 15 and the lower point of contact of the ribbon with the bridge 30. The reversely wound helical spring 55, having the previously indicated oppositely wound helical portions 55a and 55b at the ends of a connecting portion 55c, located in the lower portion of the galvanometer, is very weak or soft. The restoring torque provided by that spring combination is about equal to that provided by the ribbon 10 above the coil 15 when the period is set at about 80 to 100 seconds.

The ribbon 10 and spring 55 are of such a length that they are located along a vertical line extending through the coil without being subjected to any but minimal tension. To this end the helical spring is of a length such that it is stretched about 1 cm. when in place. This stretching, however, does not apply any substantial tension to the system. In fact, the tension in the ribbon is almost entirely due to the weight of the galvanometer coil and mirror. In effect, therefore, the coil 15 is freely suspended in the magnetic field between the poles 16 and 18 primarily only under the influence of gravity. The ribbon and helical spring 55 play almost no role whatsoever in holding the coil 15 in place.

The galvanometer coil 15 thus is essentially a free-hanging coil, that is, the helical spring 55 comprised of the two reversely wound helical sections 55a and 55b applies substantially no axial tension on the system. The slight tension introduced by the stretch of the spring merely helps hold the spring staight. With this construction, the ribbon 10 between the bridge 30 and the galvanometer coil 15 possesses a positive torque constant, and the helix sections of the spring coil 55, which is produced from the same material as the ribbon 10, also possess a positive torque constant.

The ribbon 10 and the spring 55 are composed of 24 carat gold having a thickness of 0.00015" and a width of 0.0027". Gold is employed because it is sufficiently malleable to be rolled to the desired thinness and because of its high conductivity, low Young's modulus and non-corrosive character. While a torque constant of 0.044 dyne cm./rad. is specified, in practice such a torque constant is very difficult to measure and it is found that wide variations in the torque constant of up to about 10% or more occur. For this reason even though the galvanometer coils all have the same amount of inertia, the period of the galvanometer for a given length of ribbon may vary from one galvanometer to another by as much as 5%. This is sometimes considered unsatisfactory by seismologists. The present improvement for adjusting the effective ribbon length cures this difficulty.

The spring 55 is formed by rolling a piece of the ribbon wire on a very thin mandril having a diameter of about 0.012". Two opposite ends of the ribbon are wound simultaneously on the mandril thus forming two oppositely wound helices. The flat portion 55c of the ribbon is held in contact with the mandril and under tension during the winding operation. When removed from the mandril the spring expands slightly to a diameter of about 1 mm. One advantage of employing two counterwound helices lies in the fact that the opposite ends of the spring do not tend to rotate relative to each other when the temperature changes. Consequently, a spring of this type makes it possible to adjust the galvanometer to a predetermined zero position without fear of the zero position shifting as the temperature changes.

It is found that the length of the galvanometer ribbon filament 10 required to produce a galvanometer of a particular period, of say 90 seconds, varies from one ribbon to another by as much as two centimeters, or more. With the present system, exact setting for a given period is easy. For a galvanometer employing a coil such as described above, and a ribbon having a torque constant as above indicated, a filament of about 16 to about 20 centimeters length is suitable. Here, the length of filament in the coil 55 is about equal to that of the filament 10. The present adjustment makes possible exact period determination with this structure.

Additional adjustment of the length of the period of the galvanometer coil 15 is effected through the specific arrangement of the dual-element coil 55 as it is illustrated especially in FIGS. 2 and 2a. Here, the upper end of the coil 55 is shown as being attached to the underside of the galvanometer coil 15 through a tab 100 projecting from the lower end of the coil 15 at its axis. In this construction, a negative torque constant is introduced to offset in part the combined positive torque of the ribbon 10 and the coil 55. This is effected by slightly bending or offsetting the tab 100 in one direction and the tab 56 at the lower end of the helical section 55b in the diametrically opposite direction. This offsetting disposes the axis of the coil 55 at an angle to the longitudinal axis of the ribbon 10 and the galvanometer coil 15. Such an offsetting of the tabs is small, for example, around 10° from the vertical. By thus offsetting the tabs 56 and 100 in exactly opposite directions, the axis of the spring coil 55 crosses the axis of the ribbon 10 and the galvanometer coil 15 at a very slight angle, since the coil spring 55 is much longer than the tabs. This results in a negative torque constant which produces an unstabilizing action or labilizing action which lengthens the period. The lengthening of the period increases as the offset of the tabs and the resultant degree of inclination of the axis of the spring coil 55 with respect to the vertical axis of the ribbon 10 and the galvanometer coil 15 are increased.

Thus, to lengthen the period for any given setting of the bridge 30, the angular offset of the two tabs 56 and 100 may be increased slightly, or to shorten the period the tabs 56 and 100 may be bent closer to parallelism (even to absolute parallelism or zero offset) with the vertical axis of the ribbon 10 and the galvanometer coil 15. Such a construction is especially valuable in a case where the bridge 30 has been elevated to the limit of its upward adjustment, and a somewhat greater period is still desired. Such greater period, within the range of the instrument, may be attained by angularly offsetting the tabs 56 and 100 as above indicated. The above-described structural modification for lengthening the period of the galvanometer does not affect the free-hanging characteristics of the ribbon 10 and galvanometer coil 15 as above described. The terms positive torque constant and negative constant, though well known, are defined here to help explain the action of the tilting arrangement of the spring 55. In a galvanometer, a positive torque constant is one that tends to restore the galvanometer coil to its rest position when it has been rotated therefrom. A negative torque constant is one that tends to force the galvanometer coil away from its rest position further once it has been rotated slightly therefrom. Thus, a positive torque constant has a stabilizing action while a negative torque constant produces a labilizing action. In all cases, the negative torque constant introduced by the bending of the tabs 56 and 100 is less than the positive torque constant of the ribbon and spring so that a net stabilizing positive torque constant always exists.

In the present case, the offset portions of the tabs 56 and 100 have lengths of about 3 mm. and the double helical coil has a length of about 4 cm. In practice, the tabs are bent in opposite directions while the bridge 30 is located somewhere between the extreme ends of the ribbon 10 to bring the period of the galvanometer within a suitable range, and then the bridge 30 is adjusted in order to set the period precisely at a predetermined value, such as 90.0 seconds.

Prior to making such coarse and fine adjustments the galvanometer is levelled by means of the bubble levels 46. Thereafter, the galvanometer may be moved from one place to another without requiring readjustment so long as the galvanometer is levelled in the new location.

It has been found that very good results can be achieved by employing long period galvanometers, such as a 90-second galvanometer, with a seismometer having widely different periods such as 1 second or 30 seconds. Such a galvanometer is provided with external electrical damping in the form of a variable shunting resistor that varies from about 400 ohms to 3400 ohms. As an example, for a system employing a 30-second seismograph and a 100-second galvanometer, a typical response curve is shown in FIG. 9. Here it will be noted that the maximum response occurs at about 30 seconds, thus providing relatively high sensitivity for the recording of seismic waves having periods in the range from about 10 seconds to about 4 minutes.

Though the invention has been described herein only with reference to a single embodiment thereof, it will be understood that many variations may be made therein without departing from the scope of the invention. For example, ordinarily an amplifier is omitted and the galvanometer is connected directly to a seismometer. Additionally it will be understood that in some forms of the invention, the spring connected at the lower end of the galvanometer coil may be made of a different material than the ribbon at the upper end of the galvanometer coil. While the invention has been described as particularly applicable to long period galvanometers, it will be understood that it may also be applied to galvanometers of shorter period as when a stiffer filament is employed for suspending the galvanometer coil instead of the thin ribbon described herein. In some cases, the torque constant provided by the filament will be so high compared with the torque constant of the spring that adjustment of the latter will have little effect on the period of the galvanometer. It will also be understood that whereas a bridge employing a three-point contact with the filament has been described, under some circumstances it may be advantageous to employ adjustment means that have only one or two points of contact with the filament. In the case of a ribbon-shaped filament, a bridge structure having at least two points of contact with the filament is most suitable. In some cases, the bridge structure may even grip the filament instead of merely providing one or more elements over which the filament is strung. It will, therefore, be understood that these and other variations may be made in the invention within the scope of the appended claims.

The invention claimed is:

1. A galvanometer including in combination:
    a support;
    a conductive filament suspended on said support;
    a galvanometer coil carried by a lower portion of said filament;
    guide means carried adjacent said filament;
    said guide means including a pair of spaced apart elongated elements on opposite sides of said filament; and
    bridge means engaging both of said elongated elements, said bridge means being adjustable along said elongated elements, said bridge means comprising two transversely extending members movable with said bridge means and engaging said filament on opposite sides thereof at points spaced apart along the length of said filament for varying the effective length of said filament to adjust the period of said galvanometer.

2. A galvanometer as defined in claim 1 including:
    means rotatably mounting said guide means, bridge means, filament, and galvanometer coil in said housing.

3. A galvanometer as in claim 1 including a mirror rotatable with said coil.

4. A galvanometer as defined in claim 2 including:
    a resilient member having an end attached to the underside of said galvanometer coil and another end attached to a lower portion of said support to position the lower end of said coil in substantially axial alignment with the axis of said suspended filament.

5. A galvanometer as in claim 4 including:
    oppositely offset tabs connected respectively with the lower side of said galvanometer coil and a lower portion of said support and respectively attached to said ends of said resilient member;
    said resilient member having an axis crossing the vertical axis of said filament and galvanometer coil.

6. A galvanometer as in claim 5 wherein said resilient member is a soft spring.

7. A galvanometer as in claim 5 wherein said resilient member is a coil spring having two sections coiled in opposite directions.

8. A galvanometer as defined in claim 1 wherein said elongated elements comprise a pair of rods.

9. A galvanometer including in combination:
a supporting housing including a support;
a conductive ribbon suspended on said support;
a galvanometer coil carried by a lower portion of said ribbon;
guide means on said support;
bridge means adjustably movable along said guide means and in contact with said ribbon at at least two points spaced along the length thereof for varying the effective length of said ribbon and thereby effectively varying the period of the galvanometer;
a coil spring having two sections coiled in opposite directions, said coil spring having an end attached to the underside of said galvanometer coil and another end attached to a lower portion of said supporting housing; and
opposite offset tabs connected respectively with the lower side of said galvanometer coil and a lower portion of said support and respectively attached to said ends of said coil spring, whereby the axis of said coil spring intersects the vertical axis of said filament and said galvanometer coil.

10. A galvanometer as in claim 9 wherein said guide means includes rods at opposite sides of said ribbon, said rods and said bridge means constituting a rotatable frame carrying said ribbon.

11. A long period galvanometer including in combination:
a support;
a conductive filament carried at its upper end in vertical position by said support;
a galvanometer coil carried by the lower portion of said filament;
guide means carried alongside said filament; and
bridge means movably carried by said guide means in contact with said filament for varying the period thereof;
said bridge including a back member having a narrow vertical slot slidably receiving said filament, a transverse offsetting pin in said slot, and a front member carried by said back member, said front member having a lower aligning member returning said ribbon to alignment in said slot.

12. A galvanometer including in combination:
a supporting housing;
a conductive filament supported in said housing and depending downwardly under the influence of gravity;
a galvanometer coil carried by a lower portion of said filament;
means slideable along said filament for adjusting the effective length thereof;
a pair of oppositely offset tabs connected respectively to the lower side of said galvanometer coil and a lower portion of said support housing, said tabs terminating at points that are horizontally offset in opposite directions from the vertical axis of said filament; and
a soft resilient member having one end attached to the tab on said galvanometer coil and the other end attached to the tab at the lower end of said supporting housing, said resilient member having an axis crossing the vertical axis of said filament to provide an effective turning torque on said filament and coil to partially overcome the restoring torque otherwise acting on said filament and coil whereby the natural period of said galvanometer is increased compared with the period it would have if the axis of said spring were vertical.

13. A galvanometer as defined in claim 12, wherein:
said resilient means is in the form of a coil spring having two sections at opposite ends thereof coiled in opposite directions.

References Cited by the Examiner

UNITED STATES PATENTS

| | | | |
|---|---|---|---|
| 602,527 | 4/1898 | Sullivan | 324—97 |
| 792,843 | 6/1905 | Northrup | 324—97 |
| 2,294,320 | 8/1942 | Riztmann | 324—97 |
| 2,539,158 | 1/1951 | Parsegian | 324—97 |
| 2,599,661 | 6/1952 | Richardson | 324—97 |
| 2,657,358 | 10/1953 | Richardson | 325—97 |

FOREIGN PATENTS 175,300  2/1922  Great Britain.

WALTER L. CARLSON, *Primary Examiner.*

R. V. ROLINEC, *Assistant Examiner.*